Oct. 28, 1969    A. H. WIESNER    3,475,618

NOISE CONTROL SAFETY DEVICE FOR AUTOMOBILES

Filed March 25, 1968

INVENTOR
ALBERT H. WIESNER

BY *Griffin & Branigan*

ATTORNEYS.

United States Patent Office 3,475,618
Patented Oct. 28, 1969

3,475,618
NOISE CONTROL SAFETY DEVICE
FOR AUTOMOBILES
Albert Henderson Wiesner, P.O. Box 250,
Chester, Va. 23831
Filed Mar. 25, 1968, Ser. No. 715,801
Int. Cl. H02j 1/02
U.S. Cl. 307—10
10 Claims

ABSTRACT OF THE DISCLOSURE

This disclosure describes a device for controlling the emission of noise from electrical noise producing sources located in an automobile. A brake actuated switching means controls the application of electrical power to the noise producing source. The brake actuated switching means is connected to add parallel resistance so as to short the application of power to the electrical noise producing source when the automobile brake is actuated. Alternatively, the brake actuated switching means is connected to add series resistance to the electrical circuit of the noise producing source so as to reduce the amount of power received by the noise producing source when the brake is actuated.

Background of the invention

The modern automobile has been improved by the addition of many safety features. Safety glass, dual brake systems and collapsible steering wheel are only a few of the many safety features that have been incorporated into the modern automobile.

While automobile safety has improved in many areas, other areas have changed so as to make the automobile less safe. Specifically, automobiles have become better insulated and better manufactured so that less and less noise from outside of the automobile can be heard by the driver. At the same time more and more noise producing devices, such as stereotype playback devices and air conditioners for example, have been added. Due to these changes, the hearing sense of the driver is being used less and less to aid him in avoiding accidents.

When an automobile approaches a railroad crossing in a desolate area, the normal warning given the driver is an unlighted railroad crossing sign marked on a pole. The only senses that the driver can rely on are sight and sound. However, the modern automobile is reducing the senses to sight alone, i.e., the driver must now rely on sight alone because his hearing is cut off due to the structural tightness of the automobile and due to the generation of noise inside of the automobile. In fact, when a modern automobile approaches a railroad crossing with its windows closed, its air conditioner or heater on, and its tape recorder or radio on, it is almost impossible to hear the approach of a train. Obviously, the operation of the train's horn (if it is operated) increases the possibility of the driver hearing the approach of the train. But, even when a horn is sounded, the automobile noise producing devices tend to reduce the possibility of hearing the horn.

A similar situation occurs when the automobile is approaching an uncontrolled intersection either in the city or in the country. Because of the auto noise producing sources, the driver must entirely rely on his sight to determine the existence of an oncoming vehicle. It will be appreciated that if the driver merely glances down the railroad tracks or down the cross road, it is quite easy for him to miss the oncoming vehicle. Whereas, because hearing is omni-directional as opposed to sight which is generally uni-directional, if the driver could hear as well as see, he would be better able to note the approach of the other vehicle and avoid a possible accident.

The driving situations when it becomes more critical to utilize hearing as well as sight occur at predictable times. Generally, these situations occur when the automobile is being braked. That is, when the automobile is being braked the driver is checking a dangerous situation and it is desirable that the driver hear as well as see. For example, when the auto is approaching a railroad crossing that does not have flashing warning signals, the driver will apply the brakes of the automobile to slow down the auto so that he can check for the approach of trains. Hence, this is a dangerous situation and the driver should be able to hear as well as see. Similarly, when the auto is approaching an uncontrolled cross road, he will slow down to check for crossing vehicles. And, when he slows down, he actuates the brake. Hence, it is when the brakes are applied that it becomes critical for the driver to use his hearing as well as his sight to determine if a dangerous situation exists. It is only when a driver is warned of the dangerous situation that he can act to avoid the danger.

It will be appreciated that while the insulation and tightness problem of the modern automobile causes some reduction in hearing, it is the noise producing devices that cause the greatest reduction. In fact, noise producing devices are a two-fold source of danger. For example, the radio not only causes a noise that "drowns out" exterior sounds, but, it is also a source of distraction.

Therefore, it is an object of this invention to provide a noise control safety device for automobiles.

It is also an object of this invention to provide a device for eliminating or reducing the amount of noise admitted by noise producing sources in an automobile during critical driving periods.

It is a further object of this invention to provide a device for controlling the emission of noise from noise producing sources in an automobile when the automobile's brake is actuated.

While it is desirable to reduce or eliminate the emission of noise when the brake of the automobile is actuated, it will be appreciated that a reduction in noise each time the brake is actuated could be distracting under cetain conditions. For example, when an automobile is being driven in a congested area and the brake is frequently operated, it would be distracting to have noise producing source either decrease in volume or go off each time the brake is applied.

Therefore, it is yet another object of this invention to provide a means for preventing the reduction of noise when an automobile is in a congested area where the brake is frequently applied, said means being under the control of the driver of the automobile.

Summary of the invention

In accordance with a principle of this invention a brake actuated switching means controls the application of electrical power to noise producing sources located in an automobile. The brake actuated switching means is connected to add parallel resistance so as to short the application of power to noise producing sources when the automobile brake is actuated. In this manner, the amount of electrical power applied to the noise producing sources is reduced each time the brake is applied to reduce the noise emitted by the noise producing sources.

In accordance with a further principle of this invention the brake actuated switching means is connected to add series resistance to the electrical circuit of the noise producing sources rather than short the application of power. The addition of series resistance to the circuit of the noise producing sources reduces the amount of power received by the noise producing sources when the brake is actuated by introducing additional resistance into the circuit. Because the amount of power is reduced, the amount of noise generated is also reduced.

It will be appreciated by those skilled in the art and others that the invention is an uncomplicated but effective way of reducing noise being generated in an automobile. It reduces noise at critical periods, i.e., when the automobile brake is actuated. These are the periods of time when the possibility of an accident is increased.

In accordance with a still further principle of the invention, a switching means is provided by the invention to prevent the brake actuating switching means from decreasing noise. In this manner, the brake actuated switching means can be deactivated. The deactivation will occur when the brake is being frequently operated because the increase and decrease of noise at frequent intervals can be distracting to the driver. This situation occurs when the automobile is in a congested area where it is starting and stopping at frequent intervals.

Brief description of the drawings

The foregoing objects in many of the attendant advantages of this invention will become more readily appreciated as the same becomes better understood by reference to the following detailed description when taken in conjunction with the accompanying drawings wherein.

Description of the preferred embodiments

Figure 1:
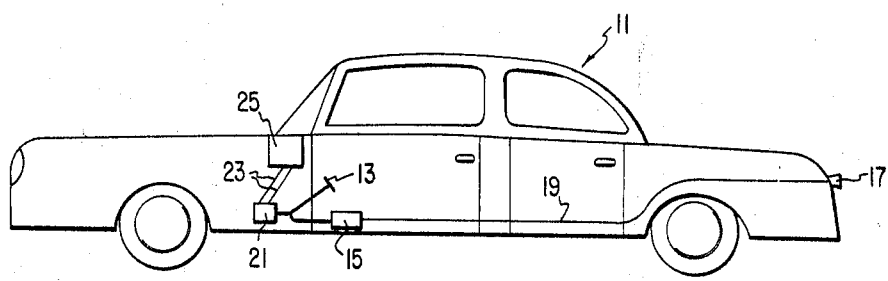
FIG. 1 is a pictorial diagram illustrating the invention mounted in an automobile.

FIG. 1 is a pictorial diagram illustrating the invention mounted in an automobile 11. The automobile has a brake pedal 13 coupled to a master cylinder 15. The master cylinder is connected to a brake light 17 by an electric line 19. In a conventional manner, when the brake pedal is depressed the master cylinder is actuated to apply braking power to the brakes of the automobile. At the same time, a brake light switch coupled to the master cylinder is actuated. The brake light switch applies electrical energy via line 19 to the brake light 17 so as to ignite the brake light. The brake light then warns drivers of following automobiles that the brake has been actuated.

Included in FIG. 1 and forming a portion of the invention is an additional brake actuated switching means 21 connected by electric lines 23 to a noise producing source 25 illustrated as a box. The noise producing source could be a radio, a stereo tape playback recorder, an air conditioner, or any other electrically energized noise producing device.

Figure 2:
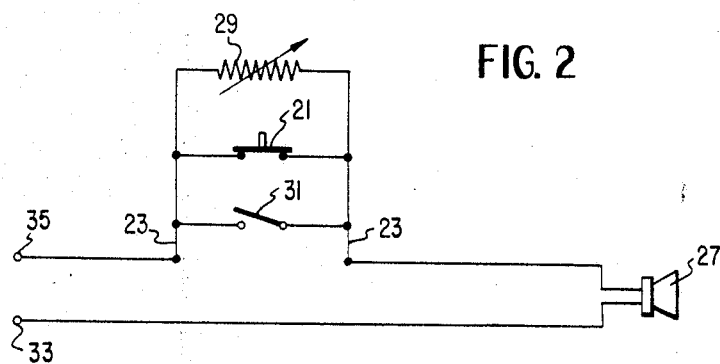
FIG. 2 is a schematic diagram of one embodiment of the invention.
Figure 3:
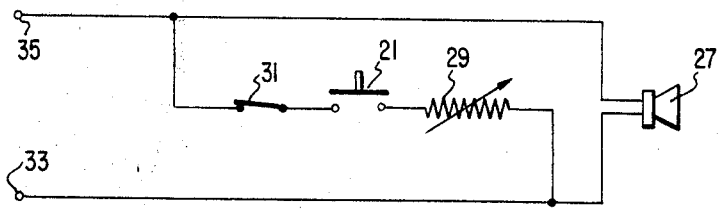
FIG. 3 is a schematic diagram of an alternative embodiment of the invention.

FIGS. 2 and 3 are schematic diagrams of electrical circuits that form alternative embodiments of the invention and control the application of electrical power to the noise producing source 25 of FIG. 1. For purpose of clarity and ease of discussion, the noise producing source is illustrated as the loudspeaker of an automobile radio. However, as described above, the noise producing source can be any electrically energized noise producing device.

The embodiment of the invention illustrated in FIG. 2 comprises: a loudspeaker 27; the brake actuated switch 21; a variable resistor 29; and a by-pass switch 31. Preferably, the by-pass switch is a single pole-single throw switch and the brake actuated switch is a momentary contact single single-pole throw switch that is normally closed.

One input terminal 33 is connected to one side of the loudspeaker 27. The other input terminal 35, that is normally connected to the other side of the loudspeaker, is connected to: one pole of the by-pass switch 31; one pole of the brake actuated switch 21; and one side of the variable resistor 29. The other side of the variable resistor 29, the other side of the brake actuated switch 21, and the other side of the by-pass switch 31 are all connected to the other side of the loudspeaker 27. In this manner, the variable resistor the by-pass switch and the brake actuated switch are all connected in parallel.

Normally, the by-pass switch is open and when the brake pedal is not depressed, the brake actuated switch 21 is closed. Hence, the variable resistor is by-passed by the brake actuated switch, and power flows to the speaker 27 in a conventional manner. That is, electrical power flows from the first input terminal 33, through the speaker, then through the brake actuated switch and out the second input terminal 35 so that the loudspeaker can generate audio signals.

When the brake pedal is depressed or actuated, the brake switch 21 is opened. When the brake actuated switch 21 is opened, the electrical power signal from the radio's amplifier must pass through the variable resistor 29 as well as the loudspeaker 27. And, the variable resistor dissipates part of the electrical signal. Hence, the variable resistor 29 limits the amount of electrical energy applied to the loudspeaker. Because of this reduction in electrical energy or power, the audio generated by the speaker 27 is reduced.

It will be appreciated that the variable resistor merely provides a control over the amount of power reduction and that, if desired, the variable resistor 29 could be replaced by a fixed resistor.

The by-pass switch 31 is provided so that the brake actuated switch 21 and its function can be by-passed. That is, when the automobile is being driven in a congested area, where frequent starts and stops are required, fluctuations in speaker noise is not desirable because fluctuations could be distracting to the driver. For this reason, the by-pass switch 31 is provided. When the by-pass switch is closed, it shorts the variable resistor 29 in the same manner that the brake actuated switch shorts the variable resistor when the brake pedal is not depressed. In addition, the by-pass switch continues to short the variable resistor even when the brake actuated switch is opened. Hence, the operation of the brake has no effect when the by-pass switch 31 is closed.

FIG. 3 illustrates an alternative embodiment of the invention that comprises: the loudspeaker 27; the brake actuated switch 21; the by-pass switch 31; and the variable resistor 29, connected in a different manner. That is, the components are the same, however, the manner of connecting the components is different. The first input terminal 33 is connected to one side of the speaker 27 and to the side of the variable resistor 29. The other input terminal 35 is connected to the other side of the speaker 27, and to one side of the by-pass switch 31. In the embodiment illustrated in FIG. 3, the by-pass switch 31 is normally closed as opposed to normally open (FIG. 2). The other side of the by-pass switch 31 is connected to one side of the brake actuated switch 21. The brake actuated switch 21 is normally open as opposed to normally closed (FIG. 2). The other side of the brake actuated switch 21 is connected to the other side of the variable resistor 29.

When the automobile brake is not actuated, full power from the radio passes to the loudspeaker 27 because the by-pass circuit (consisting of the by-pass switch, the brake actuated switch, and the variable resistor) is open. That is, because the brake actuated switch is open, the entire circuit is open. When the brake pedal is depressed, the brake actuated switch 21 is closed to complete the by-pass circuit. The by-pass circuit draws part of the current that was previously applied to the loudspeaker 27, and, hence, reduces the electrical energy applied to the loudspeaker 27. The reduction in the electrical energy applied to the loudspeaker 27 results in a reduction of the audio signal from the loudspeaker. The by-pass switch prevents the by-pass circuit from being completed when the switch is opened to prevent noise reduction when starting and stopping is recurring at frequent intervals.

It will be appreciated from the foregoing description that the invention is an uncomplicated device for controlling the application of electrical power to noise producing devices located in an automobile. And, because the invention is uncomplicated, it is suitable for widespread commercial use.

While the invention has been illustrated as reducing the power applied to the loudspeaker of the radio of an automobile, it can also be utilized to reduce the application of power to other noise producing devices. For example, the circuitry illustrated in FIG. 2 or in FIG. 3 can be utilized to control the application of power to an air conditioner or the blower of a heater. In addition, the application of power to the loudspeaker of a stereo-tape reproducer or record player can be controlled by the invention. Alternative to controlling the application of power to the loudspeaker it will be appreciated that the invention can be used to directly control the application of power to the radio or tape reproducer or record player rather than the loudspeaker.

It will be appreciated by those skilled in the art and others that the invention can take on other forms than those specifically illustrated in FIGS. 2 and 3. For example, the brake actuated switch 21 could be a relay operated rather than a mechanically operated switch. The relay could be under the control of the brake pedal. Alternatively, the brake actuated switch could be a transistor or another type of solid state switch that is controlled by depressing the brake. Moreover, there are other ways of triggering the switch. For example, the brake actuated switch could be activated by the passage of current to the brake lights. Hence, the invention can be practiced otherwise and is specifically described herein.

What is claimed is:

1. A device for controlling the emission of noise from a noise producing source located in an automobile comprising:
   brake actuated switching means actuated by the brake of said automobile for switching additional resistance into the circuit of said noise producing source when said brake is actuated; and
   resistance means electrically connected to said brake actuated switching means for providing the additional resistance to be added to the circuit of said noise producing source when said brake actuated switching means is actuated.

2. A device as claimed in claim 1, including by-pass switching means electrically connected to said brake actuated switching means and said resistance means for preventing the brake actuated switching means for switching additional resistance into the circuit of said noise producing source.

3. A device as claimed in claim 2, wherein said brake actuated switching means, said resistance means, and said by-pass switching means are all connected in parallel to form a parallel circuit.

4. A device as claimed in claim 3, wherein said parallel circuit is connected in series with said noise producing source.

5. A device as claimed in claim 4, wherein said brake actuated switching means is a single pole-single throw mechanically operated momentary contact switch that is operated by the depression of the brake pedal of said automobile, said by-pass switching means is a single pole-single throw switch and said resistance is a variable resistor.

6. A device as claimed in claim 5, wherein said noise producing source is the loudspeaker of the radio of said automobile.

7. A device as claimed in claim 2, wherein said brake actuated switching means, said by-pass switching means, and said resistance means are connected in series to form a series circuit.

8. A device as claimed in claim 7, wherein said series circuit is connected in parallel with said noise producing source.

9. A device as claimed in claim 8, wherein said brake actuated switching means is a single pole-single throw mechanically operated momentary contact switch that is operated by the depression of the brake pedal of said automobile, said by-pass switching means is a single pole-single throw switch and said resistance means is a variable resistor.

10. A device as claimed in claim 9, wherein said noise producing source is the loudspeaker of the radio of said automobile.

References Cited

UNITED STATES PATENTS

| 2,880,815 | 4/1959 | Apfelbaum | 180—82 |
| 3,051,890 | 8/1962 | Wedgewood | 323—96 X |
| 3,213,417 | 10/1965 | Lewus | 340—71 X |

ROBERT K. SCHAEFER, Primary Examiner

U.S. Cl. X.R.

180—82; 340—52